US012661672B2

(12) United States Patent
Greiner-Perth et al.

(10) Patent No.: US 12,661,672 B2
(45) Date of Patent: Jun. 23, 2026

(54) DISPENSER FOR DISCHARGING PHARMACEUTICAL LIQUIDS

(71) Applicant: Aptar Radolfzell GmbH, Radolfzell (DE)

(72) Inventors: Jürgen Greiner-Perth, Gottmadingen (DE); Andi Herz, Eigeltingen-Reute (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 923 days.

(21) Appl. No.: 17/603,428

(22) PCT Filed: Apr. 3, 2020

(86) PCT No.: PCT/EP2020/059618
§ 371 (c)(1),
(2) Date: Oct. 13, 2021

(87) PCT Pub. No.: WO2020/216599
PCT Pub. Date: Oct. 29, 2020

(65) Prior Publication Data

US 2022/0184649 A1 Jun. 16, 2022

(30) Foreign Application Priority Data

Apr. 26, 2019 (EP) .................................... 19171383

(51) Int. Cl.
*B05B 11/00* (2023.01)
*B05B 11/10* (2023.01)

(52) U.S. Cl.
CPC ...... *B05B 11/0032* (2013.01); *B05B 11/1028* (2023.01); *B05B 11/1064* (2023.01)

(58) Field of Classification Search
CPC ............. B05B 11/1028; B05B 11/1064; B05B 11/0032; B05B 11/0054; B05B 11/0067; F16K 3/265; A61M 2205/3337
(Continued)

(56) References Cited

U.S. PATENT DOCUMENTS 4,933,569 A * 6/1990 Merchlewitz ........... B05B 1/304
251/282
5,176,327 A * 1/1993 Petersen ............. B05B 12/0026
239/525

(Continued)

FOREIGN PATENT DOCUMENTS

DE 60009058 T2 3/2005
DE 102006012898 A1 9/2007

(Continued)

OTHER PUBLICATIONS

International Search Report with English Translation issued in corresponding International Application No. PCT/EP2020/059618 date of mailing Oct. 21, 2020 (12 pages).

(Continued)

*Primary Examiner* — Kevin Edward Schwartz
(74) *Attorney, Agent, or Firm* — FLYNN THIEL, P.C.

(57) ABSTRACT

A dispenser for discharging pharmaceutical liquids, in particular in the form of individual drops. Such a dispenser is designed as a side-actuation dispenser with an actuation button on the dispenser in the region of a lateral surface of the housing and has a liquid store, a pump device with a pump chamber which has a variable volume, and a dispensing opening for dispensing the liquid. The actuation button is a spring-loaded toggle switch, the volume of the liquid channel is reduced using an insert, and a special housing design is provided for the purpose of adapting the dispenser to the customer's needs.

16 Claims, 7 Drawing Sheets

(58) Field of Classification Search
USPC .................................. 239/333; 251/282, 325
See application file for complete search history.

(56) References Cited

U.S. PATENT DOCUMENTS

| | | | | |
|---|---|---|---|---|
| 5,667,143 | A * | 9/1997 | Sebion ................ | B05B 12/0024 239/528 |
| 6,302,101 | B1 * | 10/2001 | Py ....................... | B05B 11/1066 128/200.22 |
| 6,527,144 | B2 | 3/2003 | Ritsche et al. | |
| 6,543,653 | B2 | 4/2003 | Lamboux | |
| 8,006,870 | B2 | 8/2011 | Stadelhofer et al. | |
| 8,328,775 | B2 | 12/2012 | Gokhale et al. | |
| 9,073,080 | B2 * | 7/2015 | Wochele ............. | B05B 11/1004 |
| 9,592,934 | B2 * | 3/2017 | Painchaud ......... | B65D 47/2081 |
| 2002/0008122 | A1 | 1/2002 | Ritsche et al. | |
| 2002/0017294 | A1 * | 2/2002 | Py ....................... | B05B 11/1066 604/257 |
| 2002/0134798 | A1 | 9/2002 | Lamboux | |
| 2006/0065677 | A1 | 3/2006 | Py et al. | |
| 2007/0102455 | A1 | 5/2007 | Stark et al. | |
| 2007/0210114 | A1 * | 9/2007 | Stadelhofer ........... | B05B 11/105 222/207 |
| 2007/0228190 | A1 * | 10/2007 | Tanner .................... | B05B 1/302 239/526 |
| 2009/0008415 | A1 | 1/2009 | Ohshima | |
| 2010/0016814 | A1 * | 1/2010 | Gokhale ............... | A61F 9/0026 604/298 |
| 2011/0250007 | A1 | 10/2011 | Kang | |
| 2013/0218066 | A1 | 8/2013 | Duquet et al. | |
| 2014/0048569 | A1 | 2/2014 | Wochele et al. | |
| 2014/0371690 | A1 | 12/2014 | Sprada et al. | |
| 2015/0043958 | A1 | 2/2015 | Painchaud et al. | |
| 2015/0209178 | A1 * | 7/2015 | Blakey .................. | B05B 11/109 604/290 |
| 2015/0273485 | A1 * | 10/2015 | Tiberghien .............. | B05B 1/005 239/526 |

FOREIGN PATENT DOCUMENTS

| | | | |
|---|---|---|---|
| DE | 102012214426 | B3 | 8/2013 |
| EP | 1170061 | A2 | 1/2002 |
| GB | 2198038 | A | 6/1988 |
| JP | 2002128122 | A | 5/2002 |
| JP | 2006516101 | A | 6/2006 |
| JP | 2007245145 | A | 9/2007 |
| JP | 2008514310 | A | 5/2008 |
| JP | 2010511577 | A | 4/2010 |
| JP | 201286173 | A | 5/2012 |
| JP | 2014532445 | A | 12/2014 |
| JP | 2015519924 | A | 7/2015 |
| WO | 2004037708 | A2 | 5/2004 |
| WO | 2012084354 | A2 | 6/2012 |
| WO | 2013057223 | A1 | 4/2013 |

OTHER PUBLICATIONS

Written Opinion of International Searching Authority issued in corresponding International Application No. PCT/EP2020/059618 dated Oct. 21, 2021 (12 pages).

Japanese Office Action with English translation issued in corresponding Japanese Application No. 2021-558748 dated Sep. 13, 2022 (11 pages).

English translation of Japanese Office Action, issued in corresponding Japanese Application No. 2023-34789 dated Apr. 9, 2024 (4 pages).

* cited by examiner

DISPENSER FOR DISCHARGING PHARMACEUTICAL LIQUIDS

TECHNICAL FIELD

The invention relates to a dispenser for discharge of pharmaceutical liquids, especially for the dropwise discharge of pharmaceutical liquids in the form of individual droplets.

BACKGROUND AND SUMMARY

A dispenser of the generic type has a liquid reservoir, a pump device having a volumetrically variable pump chamber, and a delivery opening for delivery of the liquid. By means of the pump device, liquid can be conveyed to the delivery opening. The dispenser is designed as a side-actuation dispenser. What this means is that the dispenser has an elongate housing aligned in a main direction of extension and the delivery opening is provided at a distal end of the dispenser, with an actuating button provided for actuation of the pump device in the region of an outer surface of the housing at the side of the dispenser. The handling is typically effected in such a way that the outer surface of the housing is gripped, and the actuating button is actuated by thumb.

DE 102006012898 A1 already discloses a side-actuation dispenser of the generic type, designed as a droplet dispenser. However some aspects of the dispensers described therein are disadvantageous. For instance, it can be difficult for the user, in the case of actuation by thumb, to achieve controlled depression of the displacement of the actuating handle therein. The first use is also made difficult in that, as supplied, too much air is present in the pump chamber and the discharge channel, and the delivery valve therefore has to open at a very low positive pressure in order to enable the air to be driven out by initial actuation. Furthermore, droplet dispensers specifically require very accurate matching of all fluid-guiding components, which makes it difficult to adapt such a dispenser to customer wishes, i.e. especially to a design typical on the market for a manufacturer of pharmaceutical liquids with regard to shape and color.

One aspect of the invention is to develop a side-actuation dispenser of the generic type as described in that the disadvantages described are overcome or at least reduced.

This is achieved with a dispenser having a liquid reservoir for storing the liquid prior to discharge, a housing having an integrated pump device with a volumetrically variable pump chamber, and a delivery opening for delivery of the liquid. The pump device serves the purpose of sucking in liquid from the liquid reservoir and delivering it through the delivery opening on actuation of the dispenser.

The dispenser is configured as a side-actuation dispenser and therefore has an elongate housing aligned in a main direction of extension, and a delivery opening at a distal end of the dispenser. The housing may have an essentially round cross section, but may also vary therefrom and have more of a flat design. The liquid reservoir is preferably provided at the opposite end from the delivery opening. An actuating button for actuating the pump device is provided in the region of an outer surface of the housing at the side of the dispenser, and is displaceable between an unactuated starting position and an actuated final position depressed in the direction of a center axis. The actuating button is typically actuated by thumb.

The pump device may especially be provided with a pump chamber wall deformable in sections, implemented, for example, by an internally deformable membrane section, or a pump chamber displaceable as a whole in the manner of a piston. The depression of the actuating button results in reduction in size of the pump chamber, especially in that the piston or membrane section is displaced transverse to the main direction of extension. Typically, the pump chamber is bounded by two valves: on the inlet side by an inlet valve that opens in the event of a reduced pressure in the pump chamber relative to the liquid reservoir, and on the outlet side by an outlet valve that opens in the event of a positive pressure in the pump chamber compared to a delivery channel that leads to the delivery opening. The inlet valve is closed at identical pressure in the liquid reservoir and in the pump chamber, and preferably opens over and above a reduced pressure of about 0.1 to 0.2 bar in the pump chamber. The outlet valve is closed at identical pressure in the pump chamber and the connecting delivery channel, and preferably opens over and above a positive pressure of about 0.5 bar in the pump chamber. Upstream of the delivery opening is preferably a further valve that opens in the case of a positive pressure of the liquid in the delivery channel relative to an ambient pressure.

The aspects of the invention described hereinafter are advantageous especially in the case of implementation of a droplet dispenser, i.e. a dispenser intended to deliver pharmaceutical liquid in the form of single droplets. For this purpose, a means of droplet formation is preferably provided beyond the delivery opening, i.e. a region in which the liquid delivered collects until the volume delivered is sufficient to form a droplet which, as a result of gravity, becomes detached from the means of droplet formation. More particularly, the means of droplet formation may be a droplet formation surface surrounding the delivery opening, which especially has a flat or concave shape and/or is bounded on the outside by a sharp break-off edge with a radius of curvature of preferably less than 0.5 mm. The delivery valve mentioned in a droplet dispenser is typically designed to open at a positive pressure of preferably at least 0.3 bar, preferably at least 0.5 bar, in order that the liquid flows through the delivery opening at only low pressure and at first collects at the means of droplet formation mentioned beyond that. The positive pressure to open the valve, in the case of pharmaceutical liquids without preservatives, should not be too low in order as far as possible to prevent external fluctuations in pressure from causing opening. In the case of liquids with preservatives, the requirements are lower. It may be the case here that opening pressures of the delivery valve of down to 0.05 bar are also possible and advantageous.

If a dispenser of the invention is configured as a droplet dispenser, the pump chamber preferably has a utilizable volume formed by the volume differential between maximum volume and minimum volume of the pump chamber of between 20 μl and 50 μl, preferably between 30 μl and 40 μl. Such a volume corresponds roughly to the volume of a droplet in customary configurations of means of droplet formation. The user is thus able to deliver exactly one droplet by one actuation of the actuating button. If the means of droplet formation are designed to form larger droplets, the utilizable volume of the pump chamber is preferably correspondingly greater. Even in the case of configuration of the dispenser as a droplet dispenser, a larger pump chamber may be appropriate when several droplets are to be delivered with one actuation. It is especially preferable, moreover, that the pump chamber is configured for exactly two droplets per actuation and, for this purpose, preferably has a difference in volume between maximum volume and minimum volume of the pump chamber of between 60 μl and 80 μl, or that the pump chamber is configured for exactly three droplets per actuation and, for this purpose, preferably has a difference in volume between maximum volume and minimum volume of the pump chamber of between 90 μl and 120 μl.

A quotient between a minimum pump chamber volume and a maximum pump chamber volume is preferably not more than 1:2, especially preferably not more than 1:3. This facilitates the initial driving of air out of the pump chamber for the subsequent suction of liquid out of the liquid reservoir.

The means of droplet formation and the utilizable pump chamber volume need not necessarily be matched such that the pump chamber volume is sufficient to form at least one droplet detachable under gravity. For example, it is also possible to provide a smaller pump chamber volume than 20 μl if another kind of detachment is envisaged, especially detachment under the action of a pressure pulse. Such a pressure pulse may be achieved, for example, in that, on actuation, an obligatory minimum force has to be applied, as yet to be elucidated further down.

In the case of configuration of a dispenser of the invention as a droplet dispenser, it preferably has a liquid reservoir connected to the pump device in such a way that the pump device can reliably suck in liquid from the liquid reservoir in an upturned position with the means of droplet formation pointing downward. This is especially achieved in that, in this upturned position, the liquid reservoir is disposed above the pump device, and there is no riser tube for sucking in liquid.

In a first aspect of the invention, which relates exclusively to droplet dispensers having a droplet formation surface surrounding the delivery opening, the volumetrically variable pump chamber is bounded on one side by a displaceable and/or deformable pump chamber wall which is connected to the actuating button in a connecting region in such a way that the pump chamber wall is displaceable in the direction of the pump chamber by depression of the actuating button in a direction of displacement roughly orthogonal to the main direction of extension, and in so doing displaces the pump chamber wall.

The actuating button itself, in this first aspect of the invention, is designed as a rocker button mounted so as to be rockable with respect to the housing about a rocker axis. The rocker axis is preferably aligned orthogonally to the main direction of extension. The actuating button is depressed by the user for actuation of the pump device. For the purpose of resetting of the actuation button to its unactuated starting position, the dispenser has a spring device that acts on the actuating button in a force input region and pushes it back in the direction of the starting position. The rocker button is preferably mounted such that it is rockable by at least 5°, especially preferably by at least 10°.

The use of a rocker button permits quite exact dosage, which is highly advantageous for the generation and release of droplets as intended. This is associated in particular with the fact that the rocker button, by virtue of its pivotable linkage, does not have a tendency to twist or the like, and that the user, via the distance of the manual application of force from the rocker axis, has good controllability of the speed at which the rocker button is depressed. This is an advantage in the delivery of droplets since it can have an exact influence on the juncture of detachment of the droplet from the means of droplet formation.

The spring device that exerts a reset force on the rocker button may in principle be designed as an elastically deformable spring section in a one-piece design with the rocker button and/or in a one-piece design with the housing, or may be formed by an internally deformable pump chamber wall or a spring segment molded thereon. Preference is given, however, to a separate spring device, especially in the form of a helical spring made of plastic or metal. The spring device pushes the actuating button into its unactuated starting position, which increases the size of the pump chamber again and sucks liquid in from the liquid reservoir.

The rocker axis of the rocker button is preferably provided at an opposite end of the rocker button from the delivery opening based on the main direction of extension. In the customary manner of gripping the housing and placing the thumb onto the rocker button, this permits placing of the thumb flat on the rocker button in a sustained manner during the actuation, hence enabling particularly fine controllability of the rocking movement.

According to the application, it may be desirable to assure a minimum force for actuation. This can be effected in a particularly simple form by means of a rocker button, namely in that a detent that makes it difficult to depress the rocker button is provided on the side of the rocker button remote from the rocker axis. This detent and the rocker button are preferably matched to one another such that an actuating force of 10 newtons at the distal end of the actuating button is required to overcome the detent, including the opposing force exerted by the spring device. The required actuating force is preferably even higher, especially at least 20 newtons. A suitable geometry of the detent can have the effect that the return to the starting position including the overcoming of the detent can nevertheless be achieved solely by the force of the spring device.

The use of a detent is especially appropriate in order to generate a pressure pulse that permits the detachment of small droplets from the means of droplet formation that would not be detached purely under gravity. The pressure pulse can be brought about by means of the minimum force required by means of the detent.

If a short length of the dispenser and a resultant short configuration of the rocker button in the direction of main extension does not permit any other option or there are other reasons to do so, it may be the case that the connecting region and the force input region essentially correspond. This is the case, for example, when the site of mounting of a piston or a membrane part on the rocker button is surrounded by a spring configured as a helical spring.

It is preferable, however, when the force input region and the connecting region are provided on the rocker button at significantly different distances from the rocker axis, especially preferably with a shorter distance between the rocker axis and the connecting region than the distance between the rocker axis and the force input region. Different distances of the connecting region and the force input region from the rocker axis have various advantages, especially also simpler assembly since the return spring and the connection to the displaceable pump chamber wall are spatially separated from one another.

The rocking movement of the rocker button results in the at least partial displacement of the pump chamber wall, which increases the pressure in the pump chamber and pushes liquid in the direction of the delivery opening. Especially when an intrinsically rigid piston that forms this pump chamber is used, it may be necessary to provide a slide connection or a transmission with at least one intermediate element between the actuating button and the piston in order to convert the fundamentally rotary movement of the rocker button to a linear movement of the piston. But since the rocking angle typically does not exceed 5° to 10°, this is not required in every case.

More particularly, this need for a transmission or slide connection can be avoided in that an elastically deformable compensation section is provided between the rocker button and the pump chamber wall, i.e. an element made of a readily deformable plastic mounted between rocker button and on a mount of the pump chamber wall. Beyond that is a configuration in which the pump chamber wall is formed by a deformable membrane part. Such a membrane part can close the pump chamber on one side, especially on an opposite side from an inlet valve and/or an outlet valve. The membrane part consists at least partly and especially at least predominantly of an elastically deformable material, such that the membrane part can be secured around the circumference and can nevertheless mesh into the pump chamber. The membrane part is preferably connected directly to the rocker button and especially preferably secured to the rocker button by means of a clamp connection.

The rocker button is movable in a pivoting manner about the rocker axis aligned preferably orthogonally to the main axis of extension. In principle, such pivot mobility can be achieved by means of a simple integral hinge. By contrast, however, it is preferable when axis sections that engage with bearings on the respective other side and hence enable rocking mobility are provided in the rocker button or in a surrounding housing section. The bearings here are preferably formed by plastic arcs that have been molded in one piece onto the rocker button or the housing and have apertures to accommodate an axial section or plastic lugs with depressions to accommodate an axial section, which are especially preferably formed with assembly chamfers in order to push in the axis sections here orthogonally to the rocker axis. Such an assembly method has quite good automatability.

A similar construction with molded-on plastic arcs or plastic lugs and sections secured therein is preferably also present for safeguarding of the rocker button in that excess pivot movement beyond the starting position is reliably prevented coming from the end position. However, the apertures or depressions here are made correspondingly larger in order to enable the relative displacement of the rocker button with respect to the housing which is associated with the rocking movement.

In a second aspect of the invention, it is proposed that, in a dispenser of the generic type, the dispenser has a channel section which is aligned in main direction of extension, which is provided downstream of the pump chamber and an outlet valve of the pump device, and through which liquid can be conveyed in the direction of the delivery opening and a delivery valve provided there. The dispenser here has an insert inserted into this channel section from the distal end in order to reduce its free volume.

In technical terms, the channel section mentioned is the result of the fact that, in the side-actuation design mentioned and with use of an outlet valve disposed at the opposite end from the displaceable pump chamber wall, the liquid flow pathway from the outlet valve to the delivery valve upstream of the delivery opening is quite long. In order to be able to produce and demold this channel section in an internal housing component made of plastic, a comparatively large cross section of at least about 4 $mm^2$ is required. As a result, however, the channel section assumes quite a large volume, which complicates the first use of the dispenser since the air first has to be driven out of this channel section on first use. Therefore, according to the invention, the insert that reduces the volume of the channel section is provided. Preferably, the volume displaced by the preferably lance-shaped insert in the channel section is at least 30% of the volume in the channel section without the inserted insert, especially preferably at least 50%. Especially preferably, the channel section and the insert have an elongate cross section that becomes constantly shorter in the upstream direction from the distal end of the housing component.

The channel section is preferably provided in a first plastic housing component which also forms walls of the pump chamber and/or a feed between the liquid reservoir and the pump chamber. The insert is preferably part of a second plastic housing component which is disposed at the distal end of the first housing component and penetrated by the delivery opening. This two-part design is especially appropriate in order to create an accommodation space for a displaceable or deformable valve body of the delivery valve between the first and second housing components. The configuration of the second housing component with the insert achieves simplified assembly since the second housing component simultaneously constitutes the outlet component with the delivery opening and the insert.

Preferably, the first housing component, at its distal end, has a first circumferential land, and the second housing component has a second circumferential land, with a sealing surface on the outside of the second circumferential land adjoining an inner face of the first circumferential land to form a circumferential seal region. The valve body mentioned for the delivery valve may be disposed within the space isolated thereby. The insert that projects into the channel section is preferably provided on the second and inner circumferential land mentioned.

In a third aspect of the invention that can be implemented independently of the first and second aspect, it is proposed that the housing has two housing components that correspond to the two housing components mentioned with regard to the fundamental function. The first housing component bounds the pump chamber at least in sections. The second, adjoining housing component is penetrated by the delivery opening. In addition, a separate outer housing component that at least partly surrounds the first and second housing components is provided, wherein the second housing component projects out of the outer housing component through an aperture therein, and wherein a further aperture for actuation of the actuating button is provided in the outer housing component. This outer housing component has no liquid-guiding surfaces at all that bound a liquid pathway between liquid reservoir and delivery opening.

The outer housing component is thus of no direct functional relevance to the guiding of liquid from the liquid reservoir to the delivery opening. For that reason, its design can be matched to different demands in a comparatively simple manner, especially with regard to esthetic aspects and/or with regard to the configuration typical on the market for a manufacturer of pharmaceutical liquids. Dispensers of the type according to the invention may thus be configured differently for different purposes or different customers, but with an unchanged first and second housing component, which are optimized with regard to the optimal actuation and delivery characteristics.

The outer housing component here may be entirely optional, such that the dispenser is usable in an unrestricted manner from a technical point of view even with the outer housing component removed. However, it is advantageous when the outer housing assumes a structural function, especially in that the second housing component is secured, preferably clamped, between a distal end of the outer housing component on the one hand and a distal end of the first housing component. For this purpose, the outer housing component is preferably secured to the first housing component.

It is also advantageous when the actuating button has two button components, with one of these button components fulfilling primarily a technical function. This first button component may especially be mounted so as to be movable on the first housing component. In addition, it may have a connecting region for connection to a displaceable pump chamber wall and/or have a force input region for introduction of the force of a return spring.

The second button component is mounted on the outside of the first button component and has a pressure surface for direct manual application of force. This second button component may be secured to the first button component by means of a snap connection. The second button component, like the outer housing component, is easily adjustable with regard to its esthetic configuration, and also with regard to the configuration and arrangement of a pressure surface for application of force. It is particularly advantageous when the first button component is configured such that it permits, with the second button component not yet mounted, pushing of the outer housing component from the delivery opening side over the first and second housing component. The second button component fitted subsequently can then constitute a safeguard against removal of the outer housing component.

Rather than such a separate second button component, another possibility is a design in which a button projection is provided in the outer housing component, which is predominantly cut free with respect to the surrounding outer housing component but is connected thereto in one-piece or articulated form at one end. It is this button projection that then acts on the first button component rather than the second button component.

Preferably, a dispenser according to any of the three aspects of the invention mentioned has a removable dispenser cap which can be placed onto the dispenser housing and removed therefrom for use of the dispenser. This dispenser cap protects the delivery opening when installed. Especially preferably, such a dispenser cap is configured as a ventilated dispenser cap, and for this purpose has at least one ventilation opening by which the delivery opening is connected to a surrounding atmosphere even with the dispenser cap in place. This promotes rapid drying of any residual droplet remaining in situ. As supplied, the ventilation opening is preferably closed and is opened by the user in the course of first utilization. The dispenser cap preferably has a sterile filter that covers the ventilation openings in order to prevent introduction of microbes. In addition, the dispenser cap preferably has an integrated pad which, with the dispenser cap in place, is positioned over or on the delivery opening such that any liquid residue that remains downstream of the delivery opening is absorbed and/or decontaminated thereby.

The liquid reservoir of a dispenser of the invention is preferably provided at the opposite end of the dispenser from the delivery opening. It may be formed by a separate bottle body coupled to, preferably screwed onto, the housing surrounding the pump device. In a different configuration, an outer wall of the liquid reservoir is connected to the housing in one-piece form, preferably with a base of the bottle body formed by a separate portion secured to the outer wall. If the liquid reservoir has an invariable volume, the dispenser preferably has a ventilation channel, especially with a sterile filter, via which the liquid reservoir is connected to a surrounding atmosphere. Alternatively, the liquid reservoir may, however, also have a variable internal volume, especially in that a pouch is provided, in which the liquid is stored and which is surrounded by a rigid bottle body. A drawing plunger system also permits the implementation of a variable internal volume.

A dispenser of the invention is intended for use for the delivery of pharmaceutical liquids. Therefore, as supplied, the liquid reservoir is preferably filled with such a pharmaceutical liquid. In particular, pharmaceutical liquids are those for treatment of elevated intraocular pressure (glaucoma treatment), for treatment of dry eye and for treatment of allergies and inflammations. A particular role is played here by the following groups of molecules: alpha-2 agonists, e.g. brimonidine, prostaglandin analogs (tafluprost, latanoprost, bimatoprost, travoprost), beta-blockers, e.g. timolol, and carboanhydrase inhibitors, e.g. dorzolamide, or hyaluronic acid compounds, film formers, e.g. methylcellulose compounds, and cyclosporine, or antihistamines, e.g. olopatadine and levocabastine, steroids, e.g. loteprednol and dexamethasone, and NSAIDs, e.g. keterolac.

In addition, the dispenser of the invention is advantageously usable for liquids having molecules of one or more of the following types: trichloroacetic acid, trioxysalen, urea, zinc oxide, tacrolimus, clobetasol propionate, mometasone furoate, betamethasone dipropionate, fluocinonide, desoximetasone, triamcinolone acetonide, fluticasone propionate, hydrocortisone, clotrimazole, ketoconazole, miconazole, undecylenoic acid, terbinafine, cyclopirox, tolnaftate, akziklovir, imiquimod, docosanol, finasteride, minoxidil, dexamethasone, tramazoline, naphazoline, nostrilla, oxymethazoline, phenylephrine, phenylpropanolamine, pseudoephedrine, tetryzoline, tramazoline hydrochloride, tuaminoheptane and xylometazoline.

The components of a dispenser of the invention are preferably made from plastic. Only for the springs described and any springs present at the inlet valve and/or the outlet valve does a metallic construction constitute an alternative. The parts intended to be deformable in operation, i.e. the predominant portion of the membrane component, the valve lips and the delivery valve bodies, preferably consist of an elastomer plastic having a modulus of elasticity <200 $N/mm^2$. An example of a useful material is an LDPE (low-density polyethylene). The parts that are immobile in operation, especially all or some housing parts, preferably consist of a plastic having a modulus of elasticity >500 $N/mm^2$. This may be, for example, an HDPE (high-density polyethylene) or a PP (polypropylene).

BRIEF DESCRIPTION OF THE DRAWINGS

Further advantages and aspects of the invention are apparent from the claims and from the description that follows of preferred working examples of the invention, which are elucidated hereinafter with reference to the figures.

DETAILED DESCRIPTION

Figure 1B:
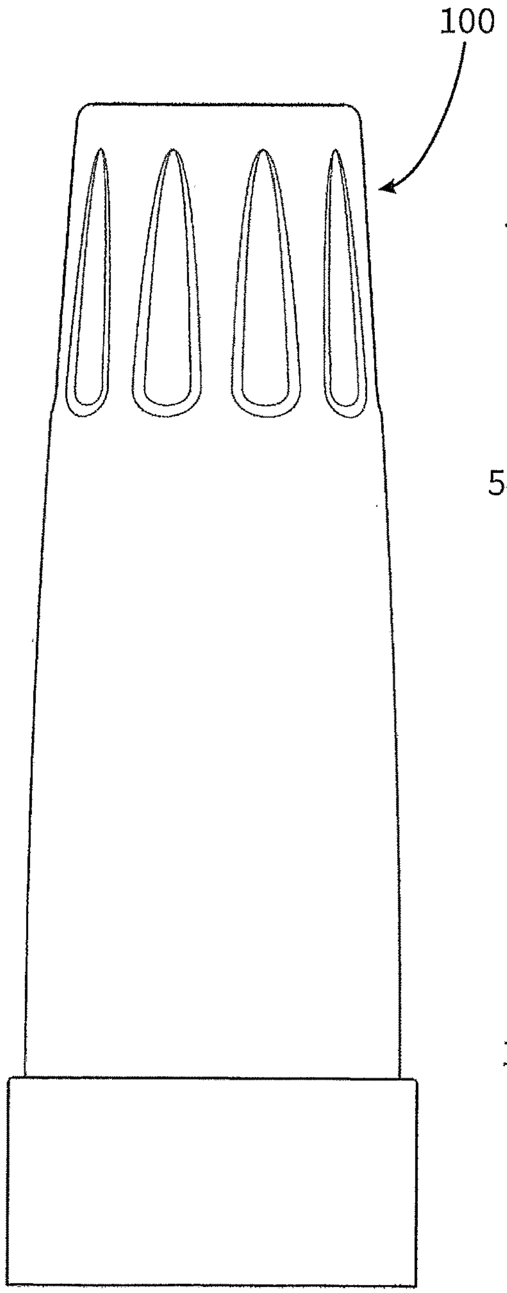
FIGS. 1A and 1B show a dispenser of the invention, comprising a main unit and dispenser cap in a non-sectional diagram.
Figure 1A:
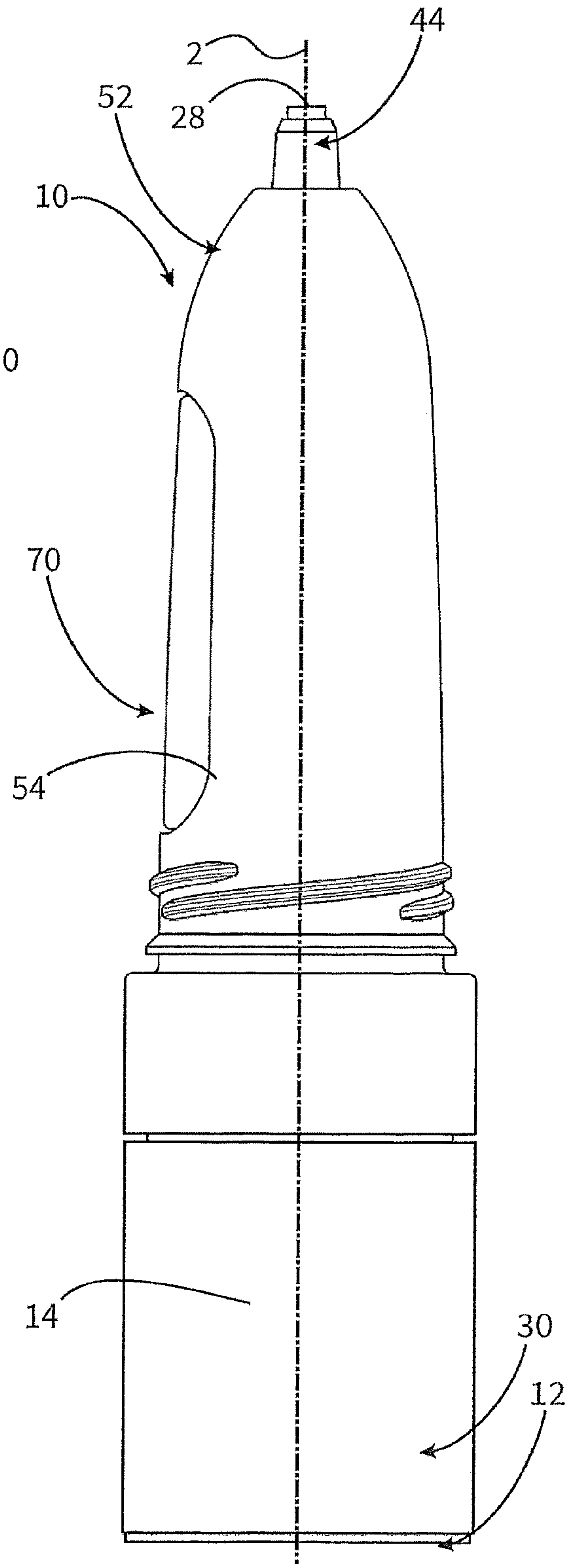

FIGS. 1A and 1B show a first working example of the dispenser 10 of the invention in a non-section diagram together with its dispenser cap. The main unit of this configuration of the dispenser shown in FIG. 1A has an elongate housing composed of various housing constituents 30, 12, 52, 44 and aligned in a main direction of extension 2. As described hereinafter, a pump device 16 is provided within the housing, by means of which liquid can be conveyed from a liquid reservoir 14 at a proximal end of the dispenser 10 to a delivery opening 28 at a distal end of the dispenser 10. For actuation of the pump device 16, an actuating button 70 is provided.

The dispenser cap 100 shown in FIG. 1B can be placed by means of a thread onto the housing of the dispenser 10.

Figure 2B:
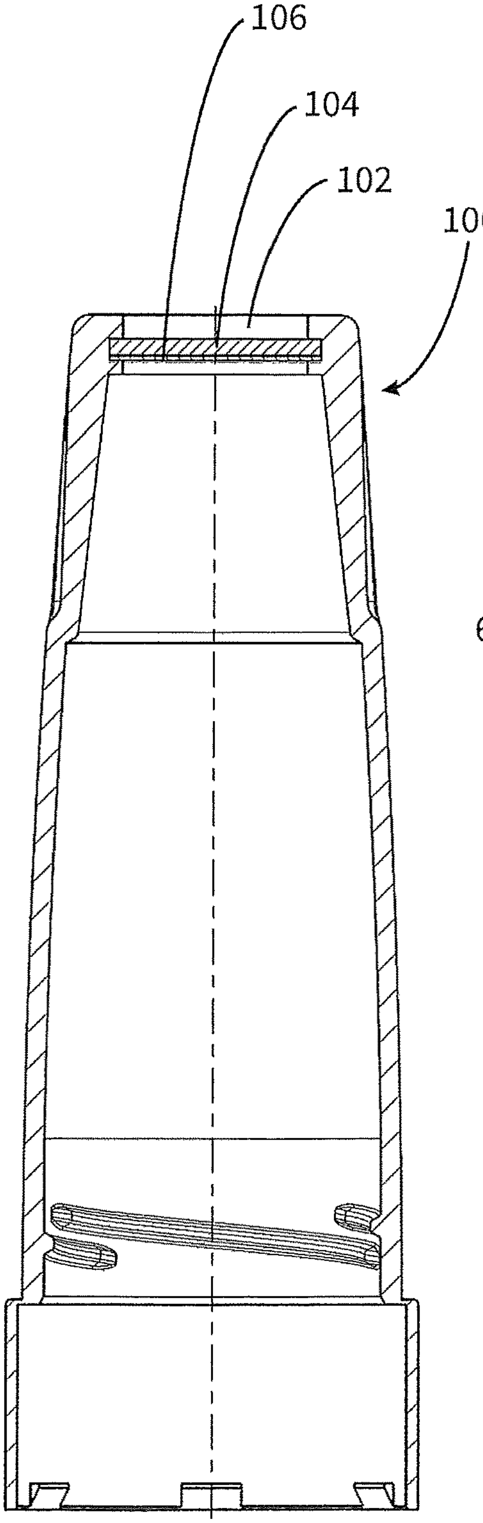
FIGS. 2A and 2B show the dispenser in a cross section diagram together with the internal pump chamber which is bounded by a membrane part and a valve component.
Figure 2A:
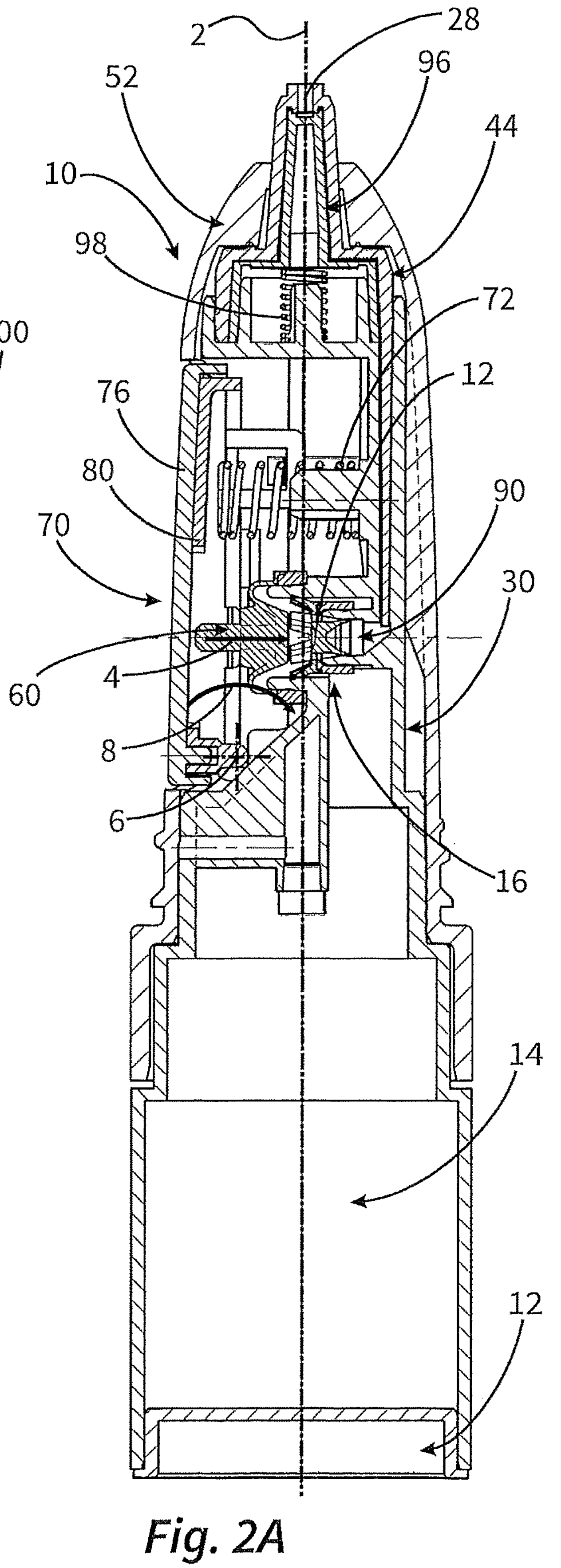

FIGS. 2A and 2B show the main unit of the dispenser 10 and the dispenser cap 100 in cross section view. The dispenser cap 100 is configured as a ventilated cap and has a ventilation opening 102 through which the delivery opening 28 is or can be connected to a surrounding atmosphere even with the dispenser cap 100 in place, preferably with a sterile filter 104 assigned to the ventilation opening 102. Further the dispenser cap 100 has a pad 106 which, with the dispenser cap 100 in place, is positioned over or on the delivery opening 28 such that any liquid residue that remains downstream of the delivery opening 28 is absorbed and/or decontaminated thereby.

The main elements are to be described first with reference to this drawing.

As apparent in FIG. 2A, the main unit of the dispenser 10 consists of multiple housing portions, the first housing component 30 of which is the largest housing component and effectively constitutes a central carrier for further components of the dispenser. This housing component 30 provides the outer wall of the liquid reservoir 14 at its proximal end. It is the carrier for various components of the pump device, especially a membrane part 60 and a valve component 90 disposed on opposite sides of a pump chamber 20. The actuating button 70 is hinged so as to pivot about a rocker axis 6 in the first housing component 30. The actuating button 70 itself consists of two button components 76, 80, with the inner button component 80 connected to the membrane part 60 in the manner described hereinafter, such that the membrane part 60 can be depressed into the pump chamber 20 by means of the actuating button 70. A return spring 72 is provided between the button component 80 and the first housing component.

A second housing component 44 is joined on at the distal end of the first housing component 30. This second housing component 44 is provided at a fixed location in the first housing component 30 and, together therewith, seals off an interior within which a deformable delivery valve body 96 is disposed, to which is in turn assigned a delivery valve spring 98. A further housing component, the outer housing component 52, surrounds the housing components 30, 44 mentioned, with the housing component 44 projecting through an aperture 58 in the outer housing component 52 by an applicator tip 46, and with the outer housing component 52 having an aperture 56 in an outer surface 54 through which the actuating button 70 can be depressed in the manner illustrated by the arrow 8, in order thereby to displace the membrane part 60 in the direction illustrated by the arrow 4.

Figure 3:
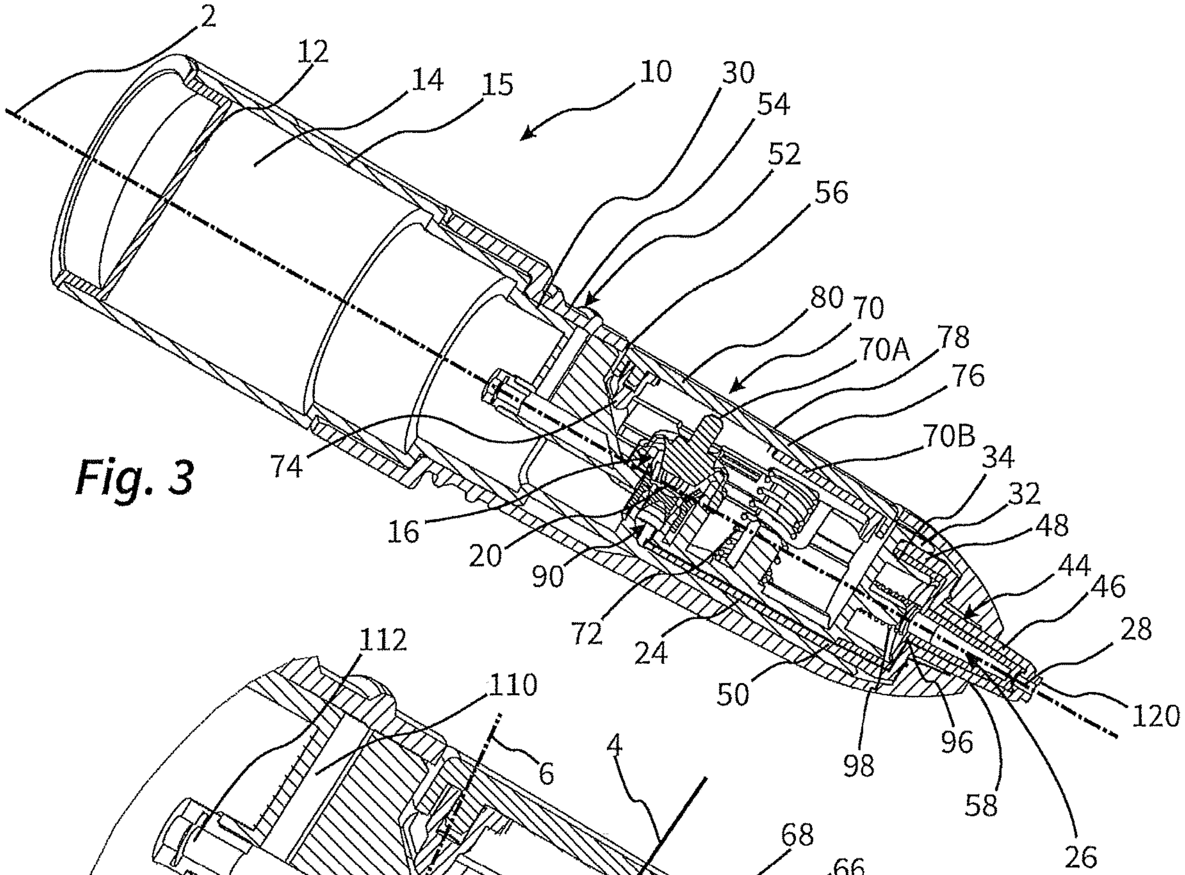
FIGS. 3 and 4 show the dispenser in perspective cross section diagrams.
Figure 4:
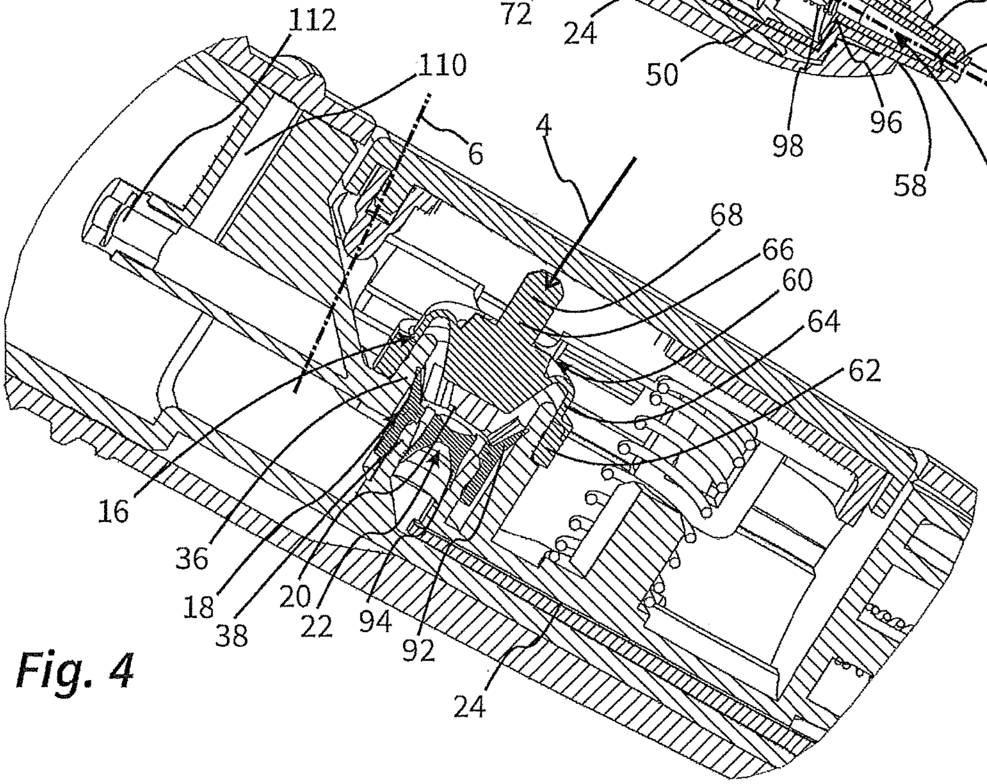
Figure 8:
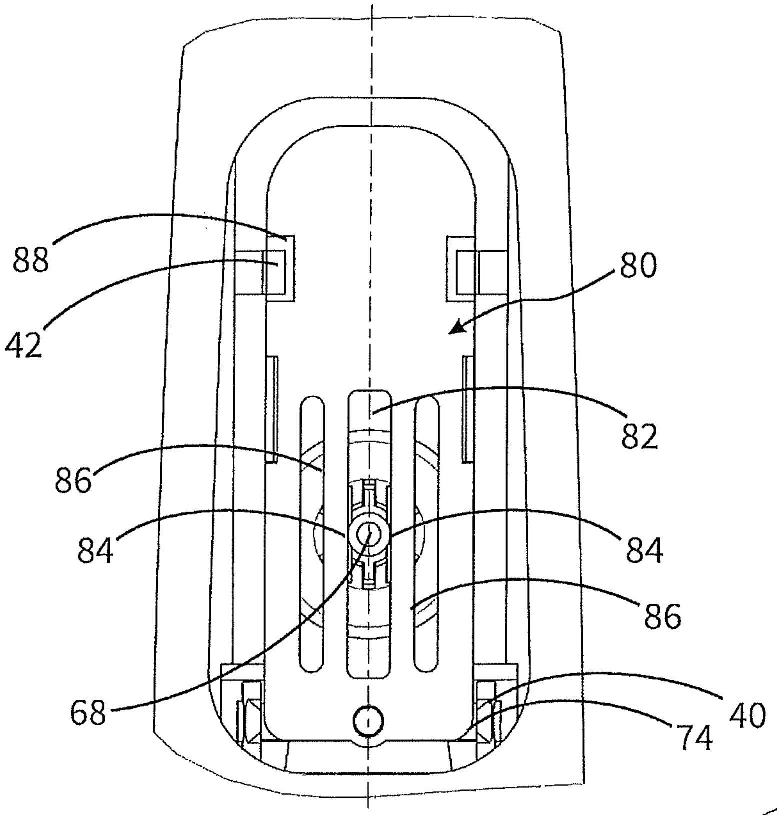
FIG. 8 shows the coupling between the actuating button of the dispenser and the membrane part.
Figure 9:
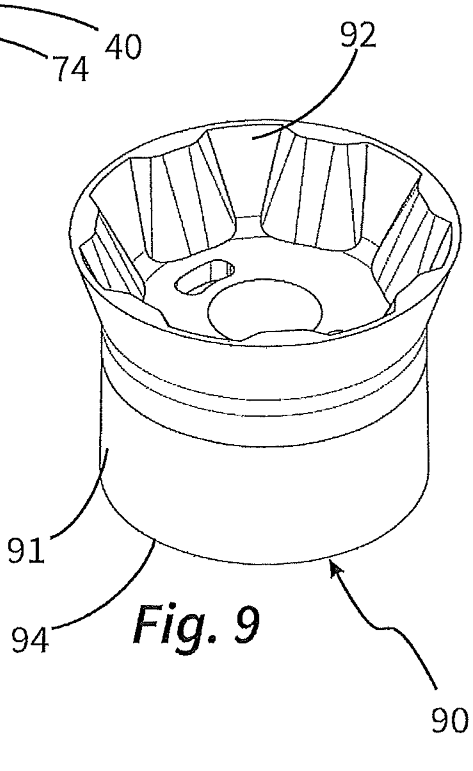
FIGS. 9 and 10 show details of the valve component and the membrane component.
Figure 10:
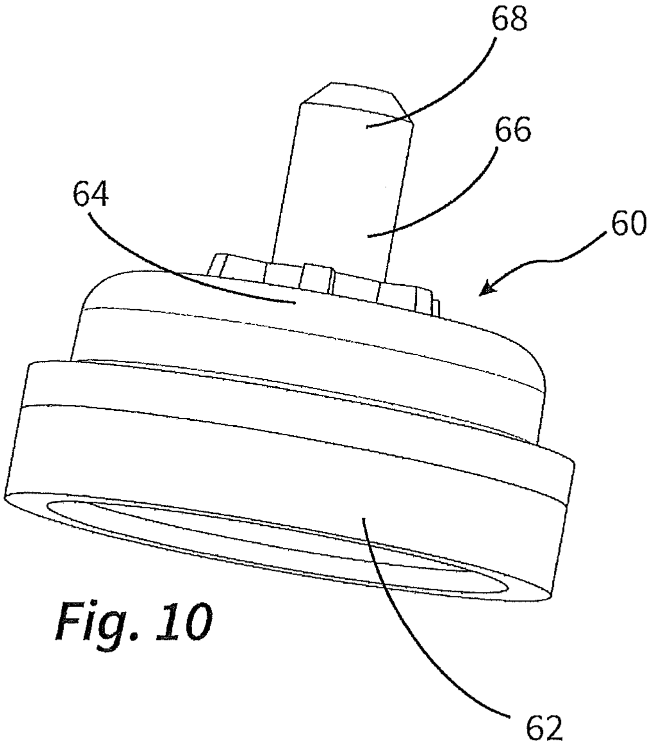

The dispenser is further elucidated by the perspective diagrams of FIGS. 3 and 4 and with reference to the details of FIGS. 8 to 10.

Before the discharge of liquid, the liquid is stored in the liquid reservoir 14, which, in the case of the working example of FIGS. 1A to 10, is bounded by an outer surface 15 which is part of the first housing component 30, and which is closed at the proximal end of the dispenser by a snap-in base 12. The dispenser 10 is typically used in an alignment in which the delivery opening 28 points downward, such that the liquid in the liquid reservoir 14 directly adjoins the valve component 90 during the actuation of the actuating button 70, namely at an inlet valve lip 92 of the inlet valve 18. In the case of reduced pressure in the adjoining pump chamber 20, the liquid can thus flow into the pump chamber 20. The pump chamber 20 itself is bounded by the valve component 90 mentioned, an annular housing section 36 of the first housing component 30, and the internally deformable membrane part 60 already mentioned.

If the membrane part is displaced in the direction of the arrow 4 and in the direction of the valve component 90, an elevated pressure is established in the pump chamber, which opens an outlet valve 22 by deflecting the outlet valve lips 94 thereof. The liquid can thus flow into a channel section 24 which is aligned in the main direction of extension 2 and leads as far as the distal end of the housing component 30. At this distal end of the housing component 30, two annular lands 32, 34 are provided. The outer land 32 has an internal diameter matched to an annular land 48 of the second housing component 44 in such a way that an interspace defined by the two housing components 30, 44 is insulated from the environment. At the annular land 48 of the second housing component 44, an appendage in the form of a lance is provided, which forms an insert 50 that projects into the channel section 24 and predominantly fills its volume. The liquid that has flowed through the channel section 24 of minimized volume as far as the second housing component 44 cannot directly escape here through the delivery opening 28, since the delivery opening 28 has an upstream delivery valve 26 comprising the delivery valve body 96 already mentioned, which is pressed against and hence closes the delivery opening 28 in a sealing manner by means of the delivery valve spring 98. With rising liquid pressure at the delivery valve 26, however, the delivery valve body 96 is deformed by the force of the delivery valve spring 98 and hence opens the liquid pathway, such that the liquid can escape through the delivery opening 28 under comparatively low pressure and forms a droplet at the droplet formation means provided beyond the delivery opening 28 in the form of a droplet formation surface 120. Only when this has a volume defined by the geometry of the means of droplet formation does it become detached, and hence it can be applied, for example, to an eye, a nostril or an ear of the user.

When the user releases the actuating button 70 after actuation, it is returned to its starting position by the spring device 72 configured in the manner of a helical metal spring. The membrane part 60 is pulled therewith and the volume of the pump chamber 20 is increased again, such that liquid is sucked from the liquid reservoir 14 into the pump chamber 20. In order to prevent this from giving rise to a reduced pressure in the liquid reservoir 14, the dispenser 10 has a ventilation channel 110 which is provided with a sterile filter 112 and permits flow of further air from an environment into the liquid reservoir 14.

Both the valve component 90 mentioned and the membrane part 60 are each configured as a component produced by two-component injection molding. Each component has a rigid component section, namely a securing ring 91, 62, onto each of which is molded a component made of soft plastic. In the case of the enlarged valve component in FIG. 9, the soft plastic especially forms the components already mentioned for the inlet valve lip 92, and the outlet valve lip 94 that cannot be seen in FIG. 9 owing to the perspective. In the case of the membrane part 60, the constituents produced from soft plastic form a pump chamber wall 64 that points in the direction of the pump chamber 20, and a thicker middle portion that merges into a compensating section 66 and a connecting section 68 on the side remote from the pump chamber.

Again with reference to the cross section diagram of FIG. 4, it is apparent that the connecting section 68 mentioned projects into the button component 80 in a connecting region 70A. It is secured here by a clamp connection. This clamp connection is elucidated in detail by FIG. 8, which shows a detail of the dispenser with button component 76 removed. As is apparent here, three apertures 82, 86 are provided in the button component 80. The aperture 82 is the actual coupling aperture. It is configured in the form of an elongate aperture, the opposite longitudinal sides of which form clamp faces 84 for definition of the connecting section. These are provided with sharp-edged profiling, which press from both sides into the connecting section 68 and hence create the desired firm clamp connection. The apertures 86 aligned in parallel thereto form assembly apertures that serve the purpose of enabling deflection of the lands between the coupling aperture and the assembly apertures during assembly without damage to these lands or other parts of the button component 80.

Likewise referring to FIG. 8, the securing of the button component 80 is elucidated. The button component 80 has two molded-on axis sections 74 that define the rocker axis 6. These axis sections 74 are mounted laterally in bearing loops 40 that are part of the first housing component 30. At the opposite end of the actuating button 70, it has two similarly configured guide loops 88, into which pins 42 of the first housing component 30 project. This prevents the spring device 72 from pushing the entirety of the button component 80 and the rocker button 70 out of the housing.

As is readily apparent from FIGS. 3 and 4, the connecting region 70A in which the button component 80 is connected to the connecting section 68 of the membrane part 60, and a force input region 70B in which the spring device 72 acts on the button component 76, are separated by different distances from the rocker axis 6. This firstly facilitates the assembly of the individual parts in the limited build space. Secondly, this advantageously allows matching of the design of the dispenser and the return force acting on the actuating button 70.

As can be seen from FIG. 8, the inner button component 80 shown therein is configured with particular regard to its technical function in terms of its shaping. In order nevertheless to achieve an esthetically pleasing configuration of the actuating button 70, the second, outer button component 76 is provided, connected to the inner button component 80 by means of a snap connection. Provided on this outer button component 76 is a pressure surface 78 on which a user places their thumb for the purpose of actuation.

As already elucidated, the dispenser shown is designed as a droplet dispenser. It is designed here such that actuation of the actuating button from an unactuated starting position to its actuated final position is to bring about the discharge of exactly one droplet. Accordingly, the pump chamber 20 is quite small and has a utilizable pump chamber volume, i.e. a difference between maximum volume and minimum volume of the pump chamber 20, of 40 μl.

The effect of this very small pump volume is that particular precautions have to be taken in order to put the dispenser into operation. As supplied, the dispenser has the pump chamber 20 filled with air. The liquid pathway from the pump chamber 20 to the delivery opening 28 is likewise filled with air.

Figure 5:
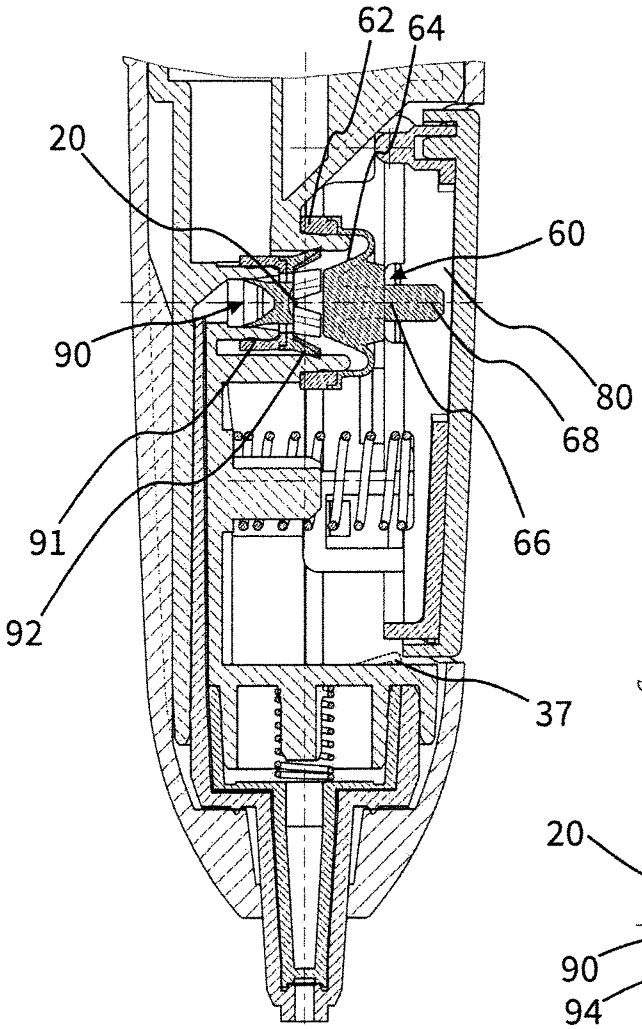
FIGS. 5 and 6 show the operation of actuating the dispenser.
Figure 6:
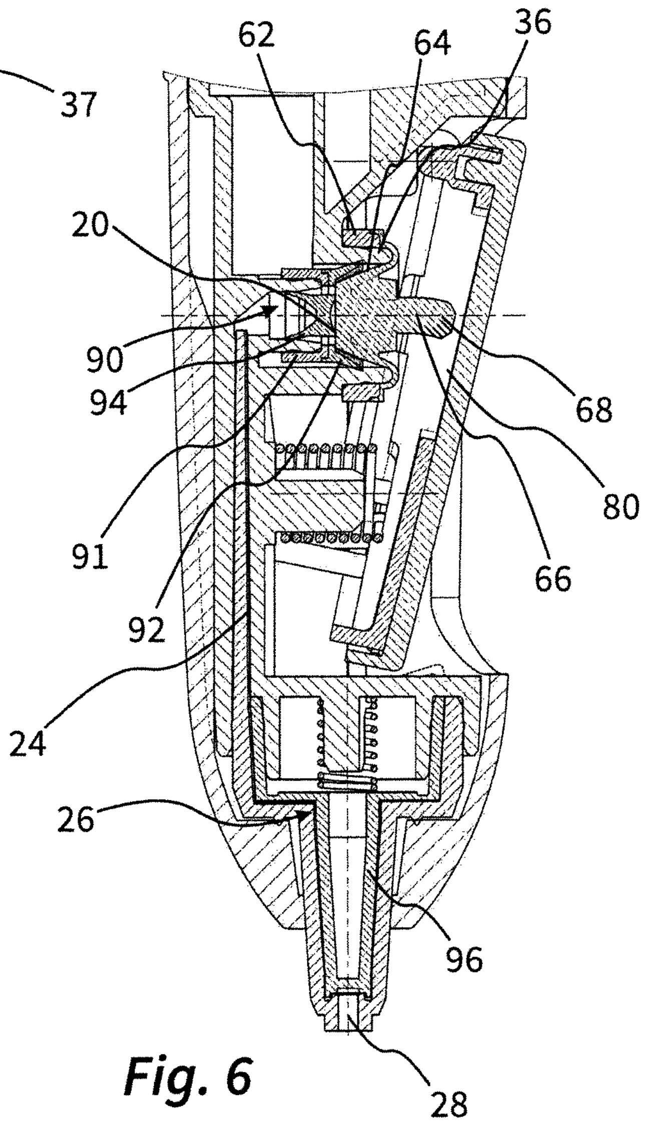

For it to be possible at all, proceeding from this starting state, to displace the air from the pump chamber 20, the pump device 16 has a very small quotient between the minimum volume of the pump chamber 20 in the actuated state and the maximum volume of the pump chamber 20 in the unactuated state. This is illustrated by FIGS. 5 and 6. FIG. 5 shows the unactuated state. FIG. 6 shows the actuated state.

It is apparent that, in the actuated state, the membrane part 60 has been displaced far enough in the direction of the valve component 90 placed onto an annular opposing wall 38 in such a way that it comes into touch contact therewith. Where the membrane part 60 and the valve component 90 come into touch contact, no residual volume remains between them. It is further apparent that the pump chamber wall 64 which is formed by the membrane part 60, in the transformation to the actuated state, is partly upturned or rolled off, such that, toward the end of the actuation, it adjoins the annular housing section 36 or only a very narrow gap remains between them. The minimum volume of the pump chamber achievable thereby, which is shown in FIG. 6, is less than 2 μl. The quotient of minimum volume and maximum volume of the pump chamber 20 is thus below 1:20.

It is also apparent from FIGS. 5 and 6 that the rocking mobility of the actuating button has the effect that the connecting section 68 of the membrane part 60 is also correspondingly rocked. In order nevertheless to enable the very small minimum volume of the pump chamber 20 mentioned, the compensation section 66 is deformed in the manner shown in FIG. 6.

A similar problem to that with the pump chamber 20 is also apparent with regard to the liquid pathway to the delivery opening 28. Here too, it is advantageous if the volume is at a minimum in order that only little air is present here in the state as supplied, which has to be driven out prior to discharge.

Here, in particular, it is the configuration of the insert 50 already described that greatly reduces the volume, such that the air driven out from the pump chamber 20 in the direction of the channel section 24, after two to three actuating operations of the actuating button 70, has reached a sufficient pressure to open the delivery valve 26.

Also provided in FIGS. 5 and 6, shown by dotted lines, is an optional detent 37 that requires a minimum force on actuation. This is especially appropriate if the dispenser is designed for a pump volume lower than that required for purely gravitational detachment of the droplet. Given such small volumes, the pressure pulse generated by the abrupt pump chamber compression can nevertheless result in detachment of the droplet from the droplet formation surface 120.

Figure 7:
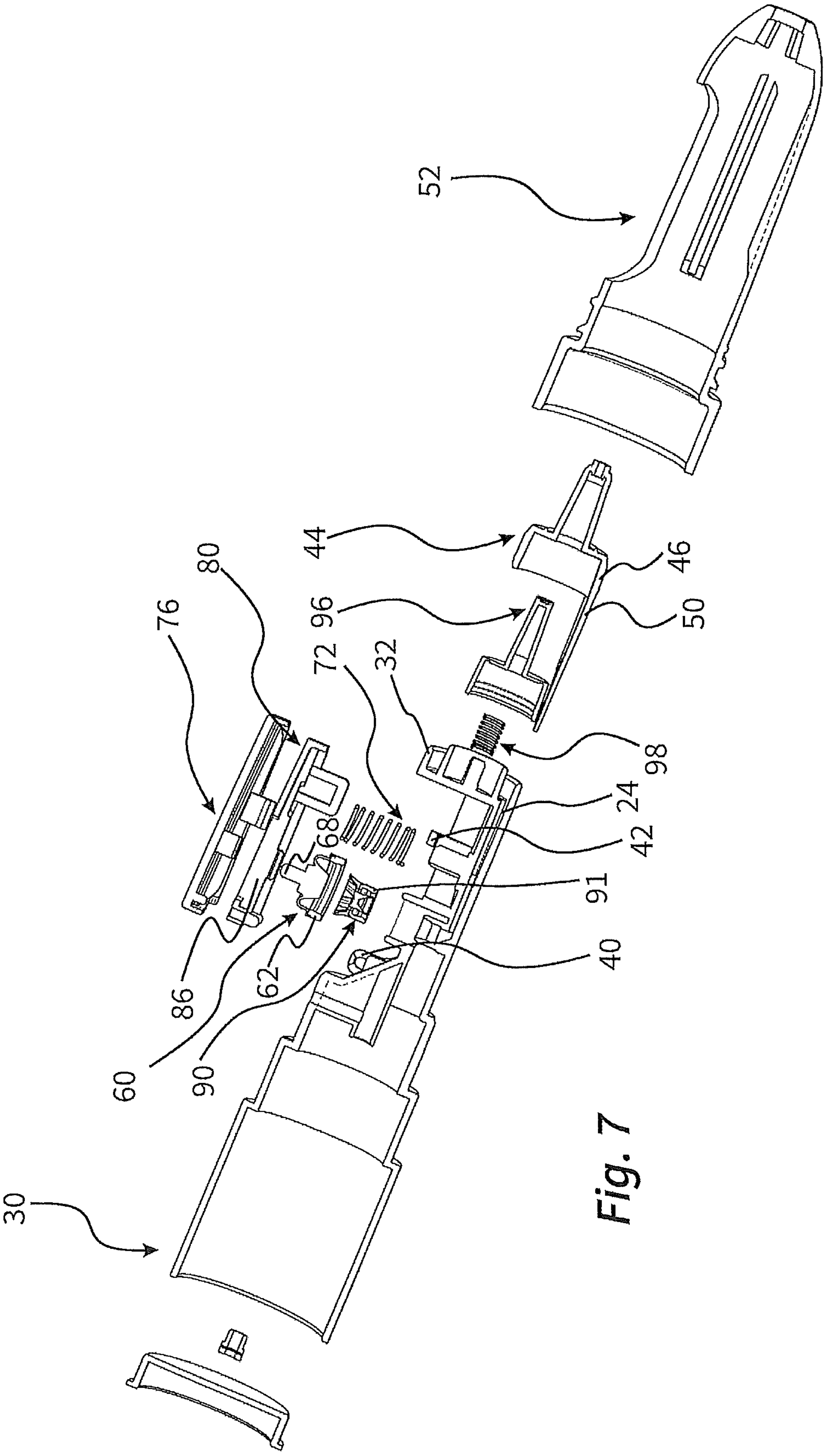
FIG. 7 illustrates the assembly sequences of the individual parts of the dispenser.

The assembly sequence is elucidated hereinafter with reference to FIG. 7.

Proceeding from the first housing component 30, the valve component 90 is inserted first and secured by means of its securing ring 91 to the annular opposing wall 38 of the first housing component 30. Subsequently, the return spring 72 and the membrane part 60 are inserted, with the membrane part 60 firmly clamped to the outside of the annular housing section 36 by means of a securing ring 62, creating a liquid-tight connection.

Subsequently, the internal button component 80 is inserted, which is pressed here into the bearing loops 40 in the region of the axis sections 74 and pushed over the pins 42 provided in the first housing component 30 in the region of the guide loops 88. During the insertion of the button component 80, the coupling aperture 82 is widened by a spreader, such that the connecting section 68 of the membrane part can fit into the coupling aperture without deformation. Subsequently, the spreader is removed, and the clamp connection described is thus created.

Thereafter, a preassembled composite of deformable delivery valve body 96 and second housing component 44 is pushed onto the end face of the first housing component 30, preceded by placement of the delivery valve spring 98 on this end face, and with additional insertion of the insert 50 into the channel section 24 of the first housing component 30.

As the last manufacturing step, the outer housing component 52 is first pushed onto the composite of the preassembled parts, which also achieves securing of the first housing component 30 and the second housing component 44 to one another. Subsequently, the second button component 76 is pressed and snap-fitted onto the first button component 80.

The two components 52, 76 have no contact with liquid at all, and therefore do not affect the discharge characteristics of the dispenser. These two components 52, 76 are those components that can be adapted as intended with regard to shape and color, in order to be able to match the dispenser 10 to individual wishes of a manufacturer of pharmaceutical liquids.

Figure 11:
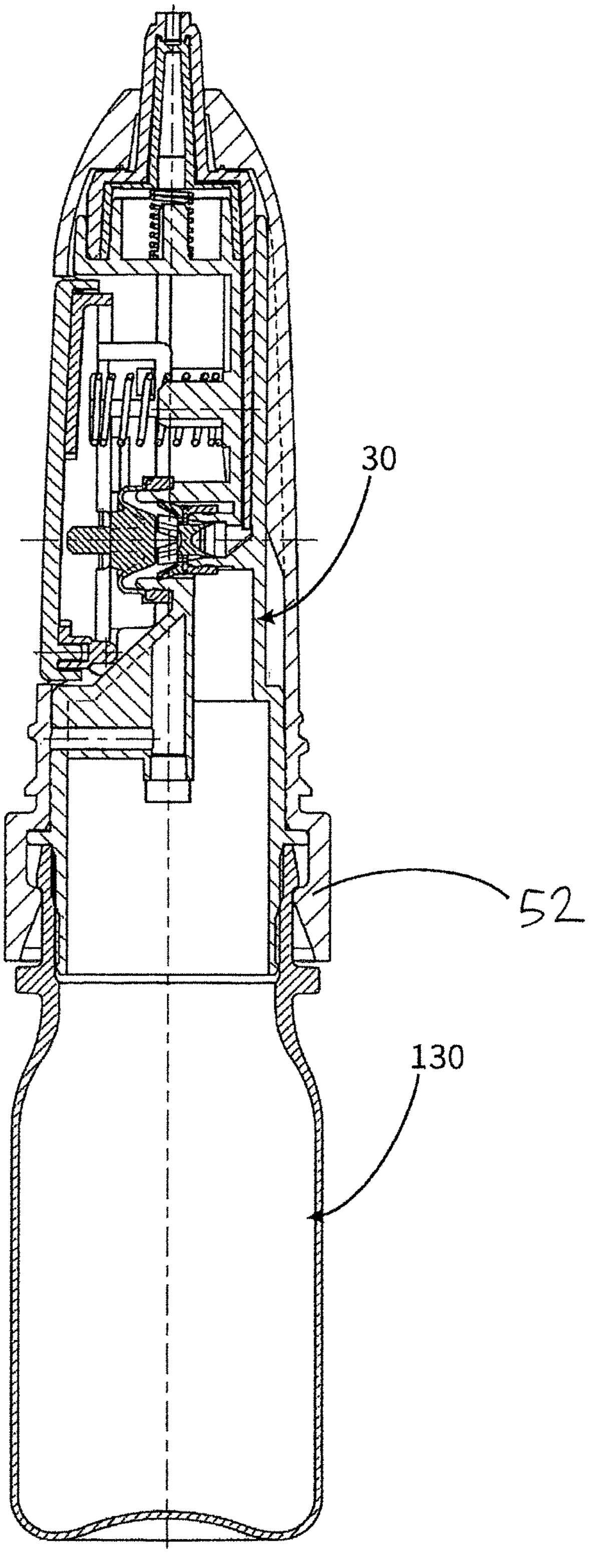
FIG. 11 shows an alternative design of the dispenser.

FIG. 11 shows a second working example of a dispenser of the invention. This has just a single difference from the aforementioned dispenser, namely a configuration of the first housing component 30 and of the outer housing component 52 such that these permit coupling to a separate bottle body 130.

The invention claimed is:

1. A droplet dispenser for discharge of pharmaceutical liquids formed as individual droplets, the dispenser comprising:

a liquid reservoir;

a pump device having a volumetrically variable pump chamber and a displaceable and/or deformable pump chamber wall bounding the pump chamber on one side;

a delivery opening for delivery of liquid, the delivery opening being disposed at a distal end of the dispenser;

a droplet formation surface surrounding the delivery opening;

an elongate housing oriented in a main direction of extension, the housing having an outer surface and an interior;

a rocker button disposed in a region of the outer surface of the housing at a lateral side of the dispenser, the rocker button having an exterior surface disposed on the lateral side of the dispenser, the exterior surface being accessible from an outside of the dispenser and configured for receiving a depressive force applied by a user, the rocker button when depressed pivoting with respect to the housing about a rocker axis between an unactuated starting position and an actuated final position, the rocker axis being disposed within the interior of the housing on the lateral side of the dispenser adjacent the exterior surface, the rocker button having a force input region disposed at a first distance from the rocker axis and a connecting region disposed at a second distance from the rocker axis, the connecting region pivoting about the rocker axis when the rocker button pivots between the unactuated starting position and the actuated final position, the second distance being different from the first distance, the rocker button being connected to the pump chamber wall at the connecting region, the rocker button acting on the pump chamber wall at the connecting region when the rocker button is depressed to reduce a size of the pump chamber; and a spring device acting on the rocker button at the force input region and subjecting the rocker button to a force in a direction of the unactuated starting position.

2. The droplet dispenser as claimed in claim 1, wherein the rocker axis is disposed at an end of the rocker button located opposite the delivery opening with respect to the main direction of extension.

3. The droplet dispenser as claimed in claim 1, further comprising a detent disposed at a side of the rocker button remote from the rocker axis, the detent being configured such that a minimum force is required to depress the rocker button.

4. The droplet dispenser as claimed in claim 1, further comprising at least one of the following:

an elastically deformable compensation section disposed between the rocker button and the pump chamber wall; and/or the pump chamber wall comprises a deformable membrane part.

5. The droplet dispenser as claimed in claim 1, wherein the rocker button includes at least one axis section and a bearing, the at least one axis section being accommodated in the bearing on a housing side.

6. The dispenser as claimed in claim 1, wherein the dispenser comprises a dispenser cap configured for placement onto the housing, the dispenser cap protecting the delivery opening when in place on the housing.

7. The dispenser as claimed in claim 1, wherein at least one of the following is met:

a difference between a maximum pump chamber volume and a minimum pump chamber volume is between 20 μl and 50 μl; and/or a quotient between a minimum pump chamber volume and a maximum pump chamber volume is not more than 1:2; and/or the dispenser has a delivery valve upstream of the delivery opening; and/or the liquid reservoir of the dispenser has an outer surface formed in one-piece with the housing and surrounding the pump device, the dispenser including a base in the form of a separate part and being secured to the outer surface at an end opposite from the delivery opening; and/or the liquid reservoir is connected to a surrounding atmosphere by a ventilation channel, or the liquid reservoir has a variable internal volume and is bounded by a flexible or displaceable wall.

8. The droplet dispenser as claimed in claim 3, wherein an actuating force of at least 10 Newtons is required at the side of the rocker button remote from the rocker axis to overcome the detent.

9. The droplet dispenser as claimed in claim 1, wherein the first distance is greater than the second distance, and/or the first distance and the second distance differ from one another by at least 20% based on a smaller one of the first or second distances.

10. The dispenser as claimed in claim 6, wherein the dispenser cap is configured as a ventilated cap and has a ventilation opening through which the delivery opening is connectable to a surrounding atmosphere even with the dispenser cap in place, and/or the dispenser cap has a pad, the pad, with the dispenser cap in place, being positioned over or on the delivery opening such that any liquid residue remaining downstream of the delivery opening is absorbed and/or decontaminated by the pad.

11. The dispenser as claimed in claim 1, wherein the rocker button is attached to the pump chamber wall at the connecting region.

12. The dispenser as claimed in claim 1, wherein the rocker button is fixed to the pump chamber wall at the connecting region.

13. The droplet dispenser as claimed in claim 1, wherein the connecting region is disposed between the rocker axis and the force input region, and the spring device is disposed in the interior of the housing in opposed relation with the force input region of the rocker button.

14. The droplet dispenser as claimed in claim 13, wherein the rocker button has first and second spaced-apart end portions and an intermediate portion disposed between the first and second end portions, the rocker axis being disposed at the first end portion, the connecting region being disposed at the intermediate portion and the force input region being disposed at the second end portion.

15. The droplet dispenser as claimed in claim 14, wherein the rocker axis is disposed within the interior of the housing adjacent the first end portion of the rocker button.

16. A droplet dispenser for discharge of pharmaceutical liquids as individual droplets, the dispenser comprising:

a liquid reservoir;

a pump device having a volumetrically variable pump chamber and a pump chamber wall defining part of the pump chamber;

a delivery opening for delivery of liquid and disposed at an end of the dispenser;

a droplet formation surface surrounding the delivery opening;

an elongate housing having an outer surface and a hollow interior;

a rocker button having an exterior portion disposed at the outer surface of the housing and depressible by a user, the rocker button being mounted for pivoting movement relative to the housing about a rocker axis between a starting position and an actuating position, the rocker button having a first region fixed to the pump chamber wall and pivoting about the rocker axis when the rocker button pivots between the starting position and the actuating position, the pump chamber wall reducing a size of the pump chamber when the rocker button is depressed from the starting position towards the actuating position, the rocker button having a second region forming a first end of the rocker button and the rocker axis is disposed within the interior of the housing at the second region and adjacent the exterior portion of the rocker button, the rocker button having a third region spaced from the second region and forming a second end of the rocker button, the first region being disposed between the second and third regions; and a spring disposed within the interior of the housing in opposed relation with the third region of the rocker button, the spring acting on the third region of the rocker button and biasing the rocker button in a direction towards the starting position.

* * * * *